(12) United States Patent
Van Oorschot et al.

(10) Patent No.: US 9,260,558 B2
(45) Date of Patent: Feb. 16, 2016

(54) WATER DILUTABLE UV-CURABLE POLYURETHANE

(75) Inventors: Josephus Christian Van Oorschot, Waalwijk (NL); Ronald Tennebroek, Waalwijk (NL); Roel Johannes Marinus Swaans, Waalwijk (NL); Marc Roelands, Waalwijk (NL)

(73) Assignee: DSM IP ASSETS B.V., Heerlen (NL)

( * ) Notice: Subject to any disclaimer, the term of this patent is extended or adjusted under 35 U.S.C. 154(b) by 441 days.

(21) Appl. No.: 12/865,614

(22) PCT Filed: Jan. 29, 2009

(86) PCT No.: PCT/EP2009/050988
§ 371 (c)(1),
(2), (4) Date: Nov. 17, 2010

(87) PCT Pub. No.: WO2009/095432
PCT Pub. Date: Aug. 6, 2009

(65) Prior Publication Data
US 2011/0052903 A1 Mar. 3, 2011

(30) Foreign Application Priority Data
Jan. 31, 2008 (EP) .................... 08101133

(51) Int. Cl.
| | |
|---|---|
| B32B 27/40 | (2006.01) |
| B32B 27/10 | (2006.01) |
| B32B 27/06 | (2006.01) |
| B32B 5/02 | (2006.01) |
| B32B 3/26 | (2006.01) |
| C08G 18/72 | (2006.01) |
| C08K 3/20 | (2006.01) |
| C09D 175/04 | (2006.01) |
| C08F 2/48 | (2006.01) |
| B05D 3/06 | (2006.01) |
| C08G 18/10 | (2006.01) |
| C08G 18/08 | (2006.01) |
| C08G 18/48 | (2006.01) |
| C08G 18/67 | (2006.01) |
| C08G 18/75 | (2006.01) |
| C09D 175/16 | (2006.01) |

(52) U.S. Cl.
CPC ............ *C08G 18/10* (2013.01); *C08G 18/0866* (2013.01); *C08G 18/4833* (2013.01); *C08G 18/673* (2013.01); *C08G 18/755* (2013.01); *C09D 175/16* (2013.01); *Y10T 428/249921* (2015.04); *Y10T 428/249991* (2015.04); *Y10T 428/31558* (2015.04); *Y10T 428/31591* (2015.04); *Y10T 428/31598* (2015.04); *Y10T 428/31601* (2015.04); *Y10T 428/31605* (2015.04)

(58) Field of Classification Search
CPC .... C08G 18/0866; C08G 18/10; C08G 18/48; C08G 18/4833; C08G 18/673; C08G 18/755; C09D 175/16; Y10T 428/249921; Y10T 428/249991; Y10T 428/31558; Y10T 428/31591; Y10T 428/31598; Y10T 428/31601; Y10T 428/31605; B05D 3/067
USPC .................... 428/423.4, 425.1, 425.6, 425.9; 427/513, 520, 541, 558; 528/59, 60; 524/591; 522/174
See application file for complete search history.

(56) References Cited

U.S. PATENT DOCUMENTS

| | | | |
|---|---|---|---|
| 5,089,586 A | 2/1992 | Piepho et al. | |
| 5,095,066 A * | 3/1992 | Meixner et al. | ............... 524/500 |
| 5,362,773 A * | 11/1994 | Brindoepke et al. | ........... 523/415 |
| 6,716,892 B1 * | 4/2004 | Mori et al. | ........................ 522/92 |
| 2003/0228424 A1 * | 12/2003 | Dove et al. | ..................... 427/553 |
| 2006/0094819 A1 | 5/2006 | Muller et al. | |

FOREIGN PATENT DOCUMENTS

GB 1147732 4/1969

OTHER PUBLICATIONS

International Search Report for PCT/EP2009/050988, mailed Jun. 4, 2009.

* cited by examiner

*Primary Examiner* — Thao T Tran
(74) *Attorney, Agent, or Firm* — Nixon & Vanderhye P.C.

(57) ABSTRACT

A water dilutable UV-curable polyurethane containing alkylene oxide groups, the polyurethane being obtained from components comprising at least: (i) 1 to 25 wt. % of at least one polyisocyanate; (ii) 0 to 80 wt. % of at least one hydroxyl functional compound containing alkylene oxide groups; (iii) 10 to 90 wt. % of at least one hydroxyl functional compound containing at least one polymerizable unsaturated (meth) acryloyl functional group per molecule; and (iv) 0 to 50 wt. % of at least one isocyanate-reactive compound not comprised by (ii) or (iii); wherein the sum of (i) to (iv) is 100%.

14 Claims, No Drawings

WATER DILUTABLE UV-CURABLE POLYURETHANE

This application is the U.S. national phase of International Application No. PCT/EP2009/050988 filed 29 Jan. 2009 which designated the U.S. and claims priority to EP 08101133.0 filed 31 Jan. 2008, the entire contents of each of which are hereby incorporated by reference.

The invention is directed to a water dilutable UV-curable polyurethane, to a method for preparing the water dilutable UV-curable polyurethane, to a coating composition comprising said water dilutable UV-curable polyurethane and to a substrate coated with the coating composition.

With the continuing concern about the use of organic solvent based coating compositions, there has been a long felt need for organic solvent-free UV-curable polyurethanes that can easily be adjusted in their viscosity by the addition of water.

In the art, several coating compositions are available which try to meet this need. However, the available coating compositions still suffer from a number of disadvantages.

For instance, the known 100% UV-curable coating compositions are too viscous for convenient handling. In order to make the compositions easier to handle, a reactive diluent is usually added to make the composition less viscous. However, these reactive diluents (e.g. multifunctional acrylates) can cause skin irritation. Alternatively, solvents can be added to reduce the viscosity but this is undesirable with respect to volatile organic cosolvent (VOC) levels and possible flammability risks. In the prior art, for example EP 320,734 A2 and EP 425,947 A2, water dispersible UV-curable polyester coating compositions are described. This technology is often based on a dispersion of acryloyl functional polyester polymer particles in water.

Commonly used water dispersed UV-curable coating compositions often have a very low viscosity that requires the use of additives such as thickeners in order to adjust the viscosity to make it suitable for, for example coating applications.

A further disadvantage of coating compositions based on such aqueous UV-curable polyurethane dispersions is that the solid content is relatively low (typically in the range of 40 to 45 wt. %, in some special cases 55 to 60 wt. %) in order to have a coating composition with manageable viscosity, such as 5 Pa·s or less at room temperature. Furthermore, the flash off times (evaporation of the water before cure by forced drying) generally are undesirably long for these systems.

In addition, these conventional particulate systems show a viscosity peak at phase inversion, which is highly undesirable. This means that during the drying process, when the system inverts from a state in which water is the continuous phase to a state in which the water-dispersible UV-curable polyurethane is the continuous phase, the viscosity changes significantly. In addition, the application tools (such as a roller coater or brush) are preferably cleaned with water. However, when the water in a water dispersed coating composition evaporates, a phase inversion occurs, which may often result in a coating composition that is less easy to clean up from the application tools.

EP 1,655,318 A2 describes an aqueous UV-curable polyurethane that is prepared by partially esterifying a hydroxyl compound having at least two oxyethylene groups per molecule with an unsaturated monocarbonic acid. The remaining hydroxyl groups are subsequently reacted with at least one polyisocyanate having isocyanate groups attached to aliphatic carbon moieties. The composition described in this document is a mixture of two materials. A disadvantage of this composition is that it gives a viscosity peak at phase inversion and that an organic cosolvent is needed to reduce this peak.

GB 1,147,732 discloses isocyano-acrylic monomers especially adaptive for radiative curing, where an isocyanate-terminated urethane prepolymer is reacted with a mono functional hydroxyl-substituted acrylate.

EP 451,590 A2 discloses unsaturated polyester polyurethanes prepared from allylether modified polyesters and a polyisocyanate, suitable for coatings which may be radiation curable.

U.S. Pat. No. 5,089,586 discloses water-dispersible nonionic allyl urethanes which are obtainable by the reaction of a polyglycol mixture with a hydroxyallyl compound and an isocyanate.

However the complete reaction of all of the hydroxyl groups with isocyanate groups can have an undesirable effect on the viscosity which may result in the gelling of the composition. Furthermore allyl groups do not have a particularly high reactivity and some hydroxyacrylates have been associated with health problems.

There remains a strong need for providing a water dilutable UV-curable polyurethane that allows high solids content with a manageable viscosity.

A further object of the invention is to provide a water dilutable UV-curable polyurethane that does not shows a significant viscosity peak upon dilution.

It was found that one or more of these objects can be met by a water dilutable UV-curable polyurethane containing alkylene oxide groups, the polyurethane being obtained from components comprising at least:

(i) 1 to 25 wt. % of at least one polyisocyanate;
(ii) 0 to 80 wt. % of at least one hydroxyl functional compound containing alkylene oxide groups;
(iii) 10 to 90 wt. % of at least one hydroxyl functional compound containing at least one polymerisable unsaturated (meth)acryloyl functional group per molecule; and
(iv) 0 to 50 wt. % of at least one isocyanate-reactive compound not comprised by (ii) or (iii);
wherein the sum of (i) to (iv) is 100%.

The term "water dilutable" as used in this application is meant to cover the situation wherein the polyurethane, when diluted with water, forms a homogeneous phase with the water and the so called phase inversion peak preferably is absent upon dilution or at least is very small. This may be defined as that the viscosity of the polyurethane of the invention upon dilution with water never exceeds the viscosity of the polyurethane of the invention at 100% solids.

The water dilutable UV-curable polyurethane of the invention comprises components (i) at least one polyisocyanate. The polyisocyanate can for instance be based on aliphatic, cycloaliphatic, araliphatic and/or aromatic polyisocyanates. Examples of polyisocyanates include ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, meta-tetramethylxylene diisocyanate, 1,4-phenylene diisocyanate, 2,4-toluene diisocyanate, 2,6-toluene diisocyanate, 4,4'-diphenylmethane diisocyanate, polymethylene polyphenyl polyisocyanates, 2,4'-diphenylmethane diisocyanate, 3(4)-isocyanatomethyl-1-methyl cyclohexyl isocyanate, and 1,5-naphtylene diisocyanate. Mixtures of polyisocyanates can be used and also polyisocyanates which have been modified by the introduction of urethane, allophanate, urea biuret, carbodiimide, uretonimine, urethdione, or isocyanurate residues.

Preferably the water dilutable UV-curable polyurethane of the invention comprises more than 1.5 wt. %, more preferably more than 2 wt. % and most preferably more than 2.5 wt. % of at least one polyisocyanate. Preferably the polyurethane comprises less than 20 wt. %, more preferably less than 15 wt. % and most preferably less than 10 wt. % of at least one polyisocyanate.

The water dilutable UV-curable polyurethane of the invention can further comprise components (ii) comprising at least one hydroxyl functional compound containing alkylene oxide groups. Component (ii) preferably has two, and more preferably may have three or more hydroxyl functional groups.

The hydroxyl functional component (ii) can for instance be based on polyalkylene glycol (such as polyethylene glycol or polypropylene glycol) and methoxy(polyalkylene glycol) (such as methoxy(polyethylene glycol) and methoxy (polypropylene glycol).

Preferably the water dilutable UV-curable polyurethane of the invention comprises more than 1 wt. % and most preferably more than 5 wt. % of component (ii). Preferably the water dilutable UV-curable polyurethane of the invention comprises less than 60 wt. %, more preferably less than 35 wt. % and especially less than 15 wt. % of component (ii).

The water dilutable UV-curable polyurethane of the invention further comprises component (iii), at least one hydroxyl functional compound containing at least one polymerisable unsaturated (meth)acryloyl functional group per molecule. Preferably component (iii) contains two or more and most preferably three or more (meth)acryloyl functional groups per molecule. A methacryloyl functional group is defined as $CH_2=C(CH_3)-C(O)-X$ and an acryloyl group functional group is defined as $CH_2=CH-C(O)-X$ where X is the rest of the compound.

This hydroxyl functional compound (iii) can optionally contain alkylene oxide groups. This hydroxyl functional compound can be an optionally alkoxylated polyol, partially esterified with (meth)acrylic acid.

Component (iii) containing at least one polymerisable unsaturated (meth)acryloyl functional group per molecule can be based on one or more polyols selected from the group consisting of polyols that have two, preferably three or more hydroxyl groups. Examples of polyols are diols, triols, tetraols, pentols, and hexols. Suitable diols include ethylene glycol, neopentylglycol, hexane diol and their alkoxylated analogues. Suitable triols include glycerol, trimethylolpropane, and alkoxylated triols (such as ethoxylated trimethylolpropane, ethoxylated glycerol, or propoxylated glycerol). Suitable tetraols include ditrimethylolpropane, pentaerythritol erythritol, arabinose, ribose, xylose, and alkoxylated tetraols (such as ethoxylated pentaerythritol). Suitable pentols include adonitol, arabitol, xylitol, fructose, galactose, glucose, mannose, sorbose and alkoxylated pentols. Suitable hexols include dulcitol, mannitol, sorbitol, dipentaerythritol, inositol and alkoxylated hexols.

The polyol can be esterified with (meth)acrylic acid to obtain a (meth)acryloyl functional group, preferably for 50 to 95 wt. %, more preferably for 60 to 90 wt. % and most preferred for 70 to 90 wt. % of the polyol.

Preferably the water dilutable UV-curable polyurethane of the invention comprises more than 30 wt. % and most preferably more than 50 wt. % of component (iii). Preferably the water dilutable UV-curable polyurethane of the invention comprises less than 85 wt. % of component (iii). Preferably component (iii) has a weight average molecular weight greater than 150 gmol$^{-1}$, more preferably greater than 180 gmol$^{-1}$ and especially greater than 200 gmol$^{-1}$. Preferably component (iii) has a weight average molecular weight less than 6,000 gmol$^{-1}$ and more preferably less than 5,000 gmol$^{-1}$.

Next to the components (ii) and (iii) as mentioned above, other additional components, such as isocyanate-reactive components (iv), can also be used like for example polyethers, polyesters and polycarbonates. Preferably any additional component (iv) has a weight average molecular weight in the range of from 500 and 6,000 gmol$^{-1}$.

Optionally, the polyurethane of the invention may comprise component (iv) bearing one or more groups selected from the group consisting of ionic and or potentially ionic water-dispersing groups. These include anionic or potentially anionic groups such as carboxylic acid groups, sulphonate groups and phosphate groups; and cationic groups. Such groups are preferably neutralised and can further increase the water dilutability of the polyurethane.

The polyurethane of the invention, if containing anionic acid functional groups, has an acid value of at least 3.5 mg KOH/g, more preferably at least 6 mg KOH/g and most preferably at least 10 mg KOH/g. Preferably the polyurethane of the invention has an acid value less than 40 mg KOH/g, more preferably less than 30 mg KOH/g and most preferably less than 20 mg KOH/g.

The water dilutable UV-curable polyurethane according to the invention preferably has a hydroxyl value that is close to zero as the polyurethane is end-capped with component (iii).

However, an excess of a hydroxyl functional compound containing at least one polymerisable unsaturated (meth)acryloyl functional group per molecule may be added during the preparation of the UV-curable polyurethane of the invention and the final composition (comprising the UV-curable polyurethane of the invention and unreacted component (iii)) may therefore have a hydroxyl group value in the range of from 0 to 150 mg KOH/g, more preferably 20 to 120 mg KOH/g and most preferably 40 to 100 mg KOH/g.

Preferably, the polyurethane comprises more than 25 wt. % of alkylene oxide groups, more preferably more than 35 wt. %, most preferably more than 40 wt. % and most preferred more than 45 wt. % based on the weight of the polyurethane. Preferably the sum of alkylene oxide groups originating from components ii) and iii) together is at least 25 wt. %, more preferably more than 35 wt. %, most preferably more than 40 wt. % and most preferred more than 45 wt. % based on the weight of the polyurethane.

Preferably the polyurethane comprises less than 75 wt. % of alkylene oxide groups, more preferably less than 65 wt. %, most preferably less than 60 wt. % and most particularly preferred less than 55 wt. % based on the weight of the polyurethane.

Preferably, the alkylene oxide groups are ethylene oxide groups. Preferably at least 5%, more preferably 10%, most preferably 20% of the total alkylene oxide groups is provided by use of an alkoxylated polyol and polyethylene glycol is particularly preferred.

The weight average molecular weight (Mw) as used herein is the value as may be determined on an Alliance Waters 2690 GPC with three consecutive PL-gel columns, type Mixed-B, 1/d=300/7.5 mm (Polymer Laboratories, Amherst Mass. 01002, USA) using tetrahydrofuran (THF) as the eluent at 1 mL/min, at 50° C. and using an Alliance Waters 2410 refractive index detector. A set of polystyrene standards (analysed according to DIN 55672) can be used to calibrate the GPC equipment.

Preferably the UV-curable polyurethane of the invention has a weight average molecular weight (Mw) of at least 2,000 gmol$^{-1}$, more preferably at least 3,500 gmol$^{-1}$ and most preferably at least 5,000 gmol$^{-1}$. Preferably the UV-curable polyurethane of the invention has a Mw of less than 30,000 gmol$^{-1}$, more preferably less than 20,000 gmol$^{-1}$ and most preferably less than 10,000 gmol$^{-1}$. Higher molecular weights may lead to increasing and undesirable viscosities and very lower molecular weights (less than 500 gmol$^{-1}$) may lead to a high fraction of very low molecular weight that may cause skin irritation.

For improved storage stability, preferably the UV-curable polyurethane of the invention has a high molecular weight fraction in the molecular weight distribution. Preferably the UV-curable polyurethane has more than 5%, preferably more than 10% and most preferably more than 15% of a higher molecular weight fraction with a weight average molecular weight (Mw) in the range of from 5,000 to 30,000 gmol$^{-1}$, more preferably 5,000 to 20,000 gmol$^{-1}$ and most preferably 5,000 to 10,000 gmol$^{-1}$.

Preferably the UV-curable polyurethane of the invention has more than 40%, preferably more than 50% of a lower molecular weight fraction with a weight average molecular weight (Mw) less than 5,000 gmol$^{-1}$ and more preferably less than 4,000 gmol$^{-1}$. Preferably the UV-curable polyurethane of the invention has more than 40%, preferably more than 50% of a lower molecular weight fraction with a weight average molecular weight (Mw) of least 500 gmol$^{-1}$ and more preferably at least 1,000 gmol$^{-1}$.

Preferably the UV-curable polyurethane of the invention has a polydispersity Pd (Mw/Mn) in the range of from 1.1 to 7, more preferably 1.2 to 5, most preferably 1.2 to 3.5 and especially 2 to 3.5.

The viscosity of the water-dilutable UV-curable polyurethane of the invention can be easily adjusted by addition of water.

Surprisingly, it was found that an aqueous composition of the polyurethane of the invention has a low viscosity, even at a high solids content of the composition. The solids content is determined by evaporation of the water in which the polyurethane is dissolved.

Furthermore, it was surprisingly found that the polyurethane of the invention show an advantageous gradual decrease in viscosity upon gradual dilution with water (or at least an absence of a sudden increase in viscosity). Thus, in general, no phase inversion occurs.

It was found that the polyurethane of the invention gives rise to relatively low viscosity at high solids content in the coating composition. An aqueous dilution of the polyurethane with a solids content of 95 wt. % preferably has a Brookfield viscosity of 10 Pa·s or less at room temperature (23+/−2° C.), more preferably 7 Pa·s or less and most preferably 5 Pa·s or less. An aqueous dilution of the polyurethane with a solids content of 95 wt. % preferably has a Brookfield viscosity of 0.1 Pa·s or more, more preferably 0.2 Pa·s or more and most preferably 0.5 Pa·s or more. An aqueous dilution of the polyurethane with a solids content of 90 wt. % preferably has a Brookfield viscosity of 7 Pa·s or less at room temperature (23+/−2° C.) and more preferably 6 Pa·s or less. An aqueous dilution of the polyurethane with a solids content of 90 wt. % preferably has a Brookfield viscosity of 0.1 Pa·s or more, more preferably 0.2 Pa·s or more and most preferably 0.4 Pa·s or more.

The Brookfield viscosity is the viscosity at room temperature, as may be determined by a method based on ISO 2555-89. The skilled person will know to choose appropriate spindle number and rotational speed, to get a read out in a suitable range, based on common general knowledge and the information disclosed herein.

In an embodiment of the invention there is provided a method for preparing a water dilutable UV-curable polyurethane according to the invention comprising reacting the components (polyols and polyisocyanates) wherein the NCO/OH ratio of all components is in the range of from 1.2 to 0.1, more preferably 0.95 to 0.15 and most preferably 0.8 to 0.2.

In an embodiment of the invention, the reaction product of the polyisocyanate (i) and the polyol (ii) is synthesised first to ensure that the polyol (ii) is fully incorporated into the polyurethane. The NCO/OH ratio of polyisocyanate (i) and polyol (ii) is preferably in the range of from 8 to 1.5, more preferably 6 to 2.0 and most preferably 4 to 2.5.

The water dilutable UV-curable polyurethane is conventionally formed by reacting the polyisocyanate with the polyols bearing isocyanate-reactive groups (e.g. hydroxyl functional groups) under substantially anhydrous conditions at a temperature between about 30° C. and about 130° C. until reaction between the isocyanate groups and the isocyanate-reactive groups is substantially complete;

If desired, catalysts such as dibutyltin dilaurate and stannous octoate, zirconium or titanium based or tertiary amine based catalysts may be used to assist the polyurethane formation.

An organic cosolvent may optionally be added before, during or after polyurethane formation to control the viscosity. Examples of cosolvents include water-miscible solvents such as N-methylpyrrolidinone, N-ethylpyrrolidinone, dimethyl acetamide, glycols and glycol ethers such as butyldiglycol, acetone, methyl ethyl ketone and alkyl ethers of glycol acetates or mixtures thereof. If solvents are used, then preferably the use of solvent is minimised.

The process of the invention can be followed by one or more suitable purification steps, such as a distillation, chromatography and the like.

Therefore, in a further aspect the invention is directed to the water dilutable UV-curable polyurethane obtained by the method of the invention.

Another advantage of the polyurethane of the invention is that it allows coating compositions with relatively high solids content. This results in relatively thick coating layers after drying. The use of a high solid coating composition has the advantage that fewer layers are needed to achieve a certain dry coating layer thickness.

In addition, shorter flash-off (removal of water) times can be achieved. The more water there is in the system, the longer it takes to remove the water. As the invention allows for higher solids content less water is required to achieve a workable viscosity and therefore less time is needed to remove the water.

In an embodiment of the invention there is provided an aqueous composition comprising:
 (a) 70 to 99 wt. % of a water dilutable UV-curable polyurethane according to the invention; and
 (b) 1 to 30 wt. % of an aqueous medium;
 wherein (a) and (b) add up to 100%.

Preferably the aqueous medium (b) is water. The aqueous medium may contain some organic solvents such as for example alcohol. Suitable alcohols include ethanol and or iso-propanol. Preferably more than 50 wt. %, more preferably more than 75 wt. % and especially more than 80 wt. % of the aqueous medium is water.

Preferably an aqueous composition comprising the polyurethane of the invention comprises less than 25 wt. %, more preferably less than 15 wt. % and most preferably less than 10 wt. % of aqueous medium. Preferably an aqueous composition comprising the polyurethane of the invention comprises at least 1 wt. %, more preferably at least 2 wt. % and most preferably at least 5 wt. % of aqueous medium.

In a further embodiment of the invention there is provided a coating composition comprising a water dilutable UV-curable polyurethane according to the invention. Preferably the solids content of the polyurethane in the coating composition is at least 80 wt. %, more preferably at least 85 wt. %, especially at least 90 wt. % and most especially at least 95 wt. %, based on the total weight of the composition. Preferably the solids content of the polyurethane in the coating composition is less than 99 wt. % and more preferably less than 98 wt. % based on the total weight of the composition. Preferably the coating composition is essentially free from organic cosolvent. Preferably the coating composition comprises less than 0.1 wt. % of organic cosolvent based on the total weight of the composition.

Furthermore, water-borne pigments can be applied in a coating composition comprising the polyurethane of the invention. Water-borne coating compositions are also easy to matt.

The coating composition can comprise one or more further ingredients, such as one more ingredients selected from the group consisting of diluents (such as water and organic diluents or solvents), inorganic pigments (such as $TiO_2$ and ZnO), organic pigments (such as nickel azo, arylamide, phenal, lithol, naphtol-AS, phthalocyanine, and carbon black), effect pigments (such as fluorescence pigments, metal pigments (aluminium, bronze), nacreous pigments), dyes, flow agents (such as methyldiethanol amine (MDEA)), levelling agents, anticrater-agents, initiators (in particular benzophenone or another photo-initiator), adhesion modifiers, viscosity modifiers, tackifiers, wax, dispersants, synergists, wetting agents (in particular pigment wetting agents), silicones, slip additives (such as polydimethyl siloxane and polyether siloxane), anti-block agents, surface tension reducing agents, fillers (such as calcium carbonates, talc), matting agents (such as sulphosuccinates), adhesion promoters, rheology modifiers, UV-stabilisers, de-foamers, thickeners, and further polymers (such as polymers selected from the group consisting of vinyl polymers, acrylic polymers, polyurethanes, polyesters and hybrids thereof). The coating composition may be formulated with UV-monomers or UV-curable oligomers like reactive diluents and multifunctional acrylates and the like.

The coating composition can for instance be a paint, a lacquer, a varnish, an enamel, ink or overprint varnish or the like.

The coating composition can be applied to a variety of substrates such as wood, board, metal, stone, concrete, glass, cloth, leather, paper, plastic, foam and the like, by any conventional method including brushing, dipping, flow coating, spraying, and the like.

In yet another embodiment of the invention there is provided a substrate selected from the group consisting of wood, board, metal, stone, concrete, glass, cloth, leather, paper, plastic and foam, where the substrate is coated with a coating composition of the invention.

Additionally according to the invention there is provided a method for coating a substrate selected from the group consisting of wood, board, metal, stone, concrete, glass, cloth, leather, paper, plastic and foam; where the substrate is coated with a coating composition of the invention; and the coating is dried and cured with UV-radiation.

The present invention is now illustrated by reference to the following example. Unless otherwise specified, all parts, percentages and ratios are on a weight basis.

EXAMPLE 1

A 4-necked reactor with condenser, mechanical stirrer and thermometer was charged with polyethylene glycol 3400 (125 g, 0.037 mol), isophorone diisocyanate (18.5 g, 0.083 mol) and acetone (100 g).

The mixture was stirred at 50° C. until the polyethylene glycol had completely dissolved. After adding dibutyltin dilaurate (0.25 g), the reaction mixture was heated to 60° C. and maintained at this temperature for 2 hours. Subsequently 2,6-di-tert-butyl-4-methylphenol (0.25 g) and pentaerythritol triacrylate (106.4 g) were added to the reactor. The mixture was heated to 70° C.

The isocyanate conversion was monitored with FTIR spectroscopy. The reaction mixture was stirred at 70° C. until the NCO peak had disappeared. The acetone was removed from the reaction mixture by vacuum distillation until the acetone wt. % was below 0.2%. The product, which at 100% solids was a crystalline solid (23° C.) was diluted with water to give a clear product with a solids content of 95 wt. % and also 90 wt. %. The Brookfield viscosity at 95 wt. % was 5 Pa·s at 25° C. At 90 wt. % a viscosity of 5.4 Pa·s at 23° C. (Brookfield RVT spindle 6, 100 rpm) was obtained. The product had a Mw of 10,590 gmol$^{-1}$ and a number average molecular weight (Mn) of 3,278 gmol$^{-1}$ (as measured by GPC). The Pd (Mw/Mn) was 3.23.

UV-curing of Example 1:

A formulation was prepared with the product from Example 1 (90 g), water (110 g), dimethyl ethanolamine (0.14 g) and Darocure 1173 (6 g). A 80 μm layer (wet) of the formulation was drawn onto a glass plate to give a coating. The coating was dried for 3 minutes at 60° C. and was cured with UV-radiation (240 nm, 80 Watt, 500 mJ). The cured coating had a Koenig hardness of 42 seconds.

EXAMPLE 2

A 4-necked 1 L reactor with Dean-Stark trap, condenser, mechanical stirrer and thermometer was charged with PentaSEO (pentaerythritol, 5 times ethoxylated, 269.5 g, 0.756 mol), Penta15EO (pentaerythritol, 15 times ethoxylated, 194.1 g, 0.244 mol), acrylic acid (216.3 g, 3 mole), hydroquinonemonomethylether (1.0 g), nitrobenzene (0.1 g), triphenylphosphite (0.18 g), methylcyclohexane solvent (188.0 g) and methane sulphonic acid (5.74 g).

The mixture was heated to reflux temperature (about 100° C.). Air was bubbled through the reaction mixture during the reaction. Reaction water was collected via the Dean-Stark trap. After 6 hours reflux the acid value had dropped to 14.8 mgKOH/g. After cooling the reaction mixture to 90° C., bisphenol-A diglycidylether (22.3 g) was added. A vacuum was applied to remove the methylcyclohexane solvent. The reaction mixture was cooled to 40° C. and subsequently isophorone diisocyanate (32.7 g, 0.147 mol), dibutyltin dilaurate (0.59 g) and 2,6-di-tert-butyl-4-methylphenol (0.35 g) were added to the reactor. The mixture was heated to 70° C.

The isocyanate conversion was monitored with FTIR spectroscopy. The reaction mixture was stirred at 70° C. until the NCO peak had disappeared.

The product, which at 100% solids had a viscosity of 900 mPa·s, (23° C., Brookfield RVT spindle 3, 100 rpm) was diluted with water to give a clear product with a solids content of 95 wt. % and also 90 wt. %. The Brookfield viscosity at 95 wt. % was 600 mPa·s at 25° C. at 90 wt. % a viscosity of 600 mPa·s at 23° C. (Brookfield RVT spindle 4, 100 rpm) was obtained. The product had a Mw of 2,136 gmol$^{-1}$ and a number average molecular weight (Mn) of 1,701 gmol$^{-1}$ (as measured by GPC). The Pd (Mw/Mn) was 1.26.

COMPARATIVE EXAMPLE 1

Example I from GB 1,147,732 was prepared however during the drop wise addition of toluene diisocyanate to the polyethyleneglycol 1000, large gel lumps were formed and it was not possible to continue the reaction with the beta-hydroxyl propyl acrylate.

The invention claimed is:

1. An aqueous composition comprising:
    (a) 70 to 99 wt. % of a water dilutable UV-curable polyurethane having a weight average molecular weight of less than 30,000 gmol$^{-1}$ and an acid value of less than 20 mg KOH/g; and
    (b) 1 to 30 wt. % of an aqueous medium, wherein components (a) and (b) add up to 100%, and wherein the water dilutable UV-curable polyurethane contains ethylene oxide groups, the water dilutable UV-curable polyurethane being obtained from components comprising at least:
        (i) 1 to 25 wt. % of at least one polyisocyanate;
        (ii) 0 to 80 wt. % of at least one hydroxyl functional compound containing ethylene oxide groups;
        (iii) 10 to 90 wt. % of at least one hydroxyl functional compound containing at least one polymerisable unsaturated (meth)acryloyl functional group per molecule; and
        (iv) 0 to 50 wt. % of at least one isocyanate-reactive compound not comprised by (ii) or (iii); wherein the sum of (i) to (iv) is 100%, and wherein the water dilutable UV-curable polyurethane is free of organic solvent and when diluted with water forms a homogenous phase with the water such that the polyurethane upon dilution with water has a viscosity which does not exceed a viscosity of the polyurethane at 100% solids, and wherein the sum of ethylene oxide groups originating from components (ii) and (iii) is at least 25 wt. % and less than 75 wt. % based on the weight of the polyurethane.

2. The aqueous composition according to claim 1, where component (iii) of the water dilutable UV-curable polyurethane contains two or more polymerisable unsaturated (meth) acryloyl functional groups per molecule.

3. The aqueous composition according to claim 1, where component (iii) of the water dilutable UV-curable polyurethane contains three or more hydroxyl functional groups per molecule.

4. The aqueous composition according to claim 1, wherein the weight average molecular weight of the water dilutable UV-curable polyurethane is at least 2,000 gmol$^{-1}$.

5. The aqueous composition according to claim 1, wherein the water dilutable UV-curable polyurethane more than 5% of a higher molecular weight fraction with a weight average molecular weight in a range of from 5,000 to 30,000 gmol$^{-1}$.

6. The aqueous composition according to claim 1, wherein the water dilutable UV-curable polyurethane has more than 40% of a lower molecular weight fraction with a weight average molecular weight less than 5,000 gmol$^{-1}$.

7. The aqueous composition according to claim 1, wherein the water dilutable UV-curable polyurethane a polydispersity Pd (Mw/Mn) in a range of from 1.1 to 7.

8. The aqueous composition according to claim 1 having a Brookfield viscosity of 10 Pa·s or less for a 95 wt. % solids aqueous solution at 23+/−2° C.

9. A method for preparing an aqueous composition according to claim 1, comprising forming the UV-curable polyurethane of by reacting the components (i) to (iv) thereof, wherein the NCO/OH ratio of all components is in the range of from 1.2 to 0.1, and thereafter combining the UV-curable polyurethane with the aqueous medium.

10. A method for preparing an aqueous composition according to claim 9, comprising reacting component (i) and, if present, (ii), and thereafter reacting a product thereof with component (iii) and, if present, component (iv).

11. A coating composition comprising the aqueous composition according to claim 1.

12. The coating composition according to claim 11, which comprises a the solids content of the water dilutable UV-curable polyurethane of at least 80 wt. % based on total weight of the composition.

13. A coated substrate comprising a substrate selected from the group consisting of wood, board, metal, stone, concrete, glass, cloth, leather, paper, plastic and foam, and a coating on the substrate, wherein the coating is comprised of the coating composition according to claim 11.

14. A method for coating a substrate selected from the group consisting of wood, board, metal, stone, concrete, glass, cloth, leather, paper, plastic and foam, wherein the method comprises applying a coating of the coating composition according to claim 11 onto the substrate; drying the coating and curing the dried coating with UV-radiation.

* * * * *